Jan. 20, 1953  H. A. KUTZER  2,626,003
SAFETY DEVICE FOR MOTOR VEHICLES
WITH AUTOMATIC TRANSMISSIONS
Filed April 14, 1950
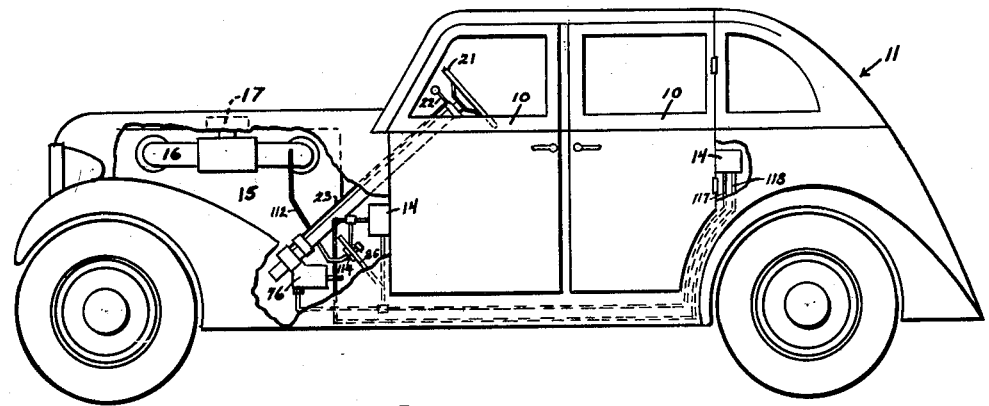
Fig.1.
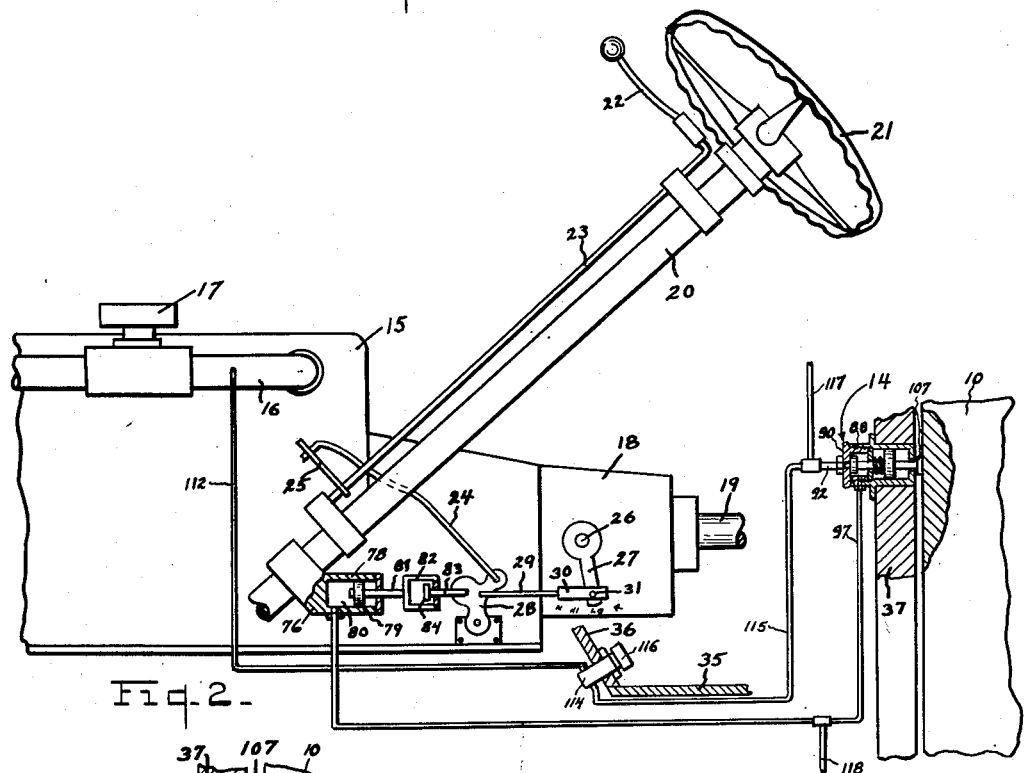
Fig.2.
Fig.3.
INVENTOR.
HENRY A. KUTZER.
BY
Joseph B. Lindecker.
ATTORNEY.

Patented Jan. 20, 1953

2,626,003

UNITED STATES PATENT OFFICE 2,626,003

SAFETY DEVICE FOR MOTOR VEHICLES WITH AUTOMATIC TRANSMISSIONS

Henry A. Kutzer, Chicago, Ill.

Application April 14, 1950, Serial No. 155,820

3 Claims. (Cl. 180—82)

This invention relates to improvements in safety devices relating to vehicles, and especially to motor road vehicles provided with automatic gear shifting transmissions.

Notwithstanding laws to the contrary, many automobile drivers leave the engines running when leaving their cars, thereby endangering lives and property. This is particularly true in the present makes of automobiles with "automatic transmissions" which do not have a clutch pedal connected therewith.

It is the primary object of the present invention to provide a device which will automatically operate to prevent the movement of a vehicle by its own power from a standing position, if any of the doors of the vehicle are open.

A further object of the invention is to provide a valve controlled device for motor vehicles, which, if all of the vehicle doors are properly closed, will permit the normal operation of the vehicle, but if any one door is open, the device will prevent the gear shift control lever from remaining in any position except the neutral position.

A device for the above purpose according to my invention may consist of vacuum means, associated with a door and adapted to function only by opening of the door. I accomplish the present invention by having a vacuum type valve, or similar means, so arranged between the door of the vehicle and other parts of the machine, that when the door is opened the gear shift control lever will be automatically moved into neutral position.

Where, as is usual, the vehicle has more than one door, the various valves will be connected in parallel throughout the system so any one valve will cause my invention to function. Also, the system is connected with a spring loaded master valve located upon the floor, or elsewhere, which will allow the vehicle to be operated in a normal manner in an emergency with a door in open position, simply by keeping said spring loaded valve depressed.

When the engine is running and when my invention is operated by vacuum means, it comprises a valve means associated with a door, said valve being adapted to be opened only when a door is opened, the valve being in a pipe line system connected to an operating cylinder and with the manifold of the engine, and when said valve is opened and the engine is running a vacuum is transmitted thru the pipe system to said operating cylinder, or vacuum operable actuating means, which may be connected directly or indirectly with the gear shift control mechanism and which will cause the gear shift lever to be moved to the neutral position should it be in a driving position; thereby preventing the vehicle from being placed in motion. A spring loaded master valve upon the floor, or elsewhere, may be depressed and held down to prevent the vacuum operable actuating means from functioning in case of an emergency and it being necessary to drive the vehicle with an open door.

These and other objects and advantages, including those arising from the specific formation and arrangement of the component parts of the device, will become apparent from the following description, reference being made to the accompanying drawings wherein:

Figure 1 is a side elevational view of an automobile partially in section showing a vacuum operated gear shift safety device associated with the doors of the automobile.

Figure 2 is a view showing a vacuum type safety device assembled thereto and applied to a motor vehicle partially in section.

Figure 3 is an enlarged cross section of a part of the vehicle showing details of the vacuum type valve, with the vehicle door in closed position.

Referring to the drawings by reference numerals it will be seen that in accordance with the present invention there is provided for each of the doors 10 of a conventional automobile 11 a vacuum type valve 14, as shown in Figure 1. In the figures I have indicated the engine as 15, the intake manifold as 16, the carburetor as 17, the automatic-transmission housing as 18, propeller shaft as 19, the steering column as 20, the steering wheel as 21, the gear shift lever as 22, the gear shift control shaft as 23, the shift control rod as 24, the control shaft lever as 25, the transmission selector shaft as 26, the selector shaft lever as 27, the bellcrank as 28, selector rod as 29, selector rod clevis as 30, clevis pin as 31, the horizontal floor board as 35, the inclined floor board as 36, and the front wall or door pillar of the vehicle as 37, to which the front door is hinged.

Between the opopsite edges of the door 10 and of said wall 37, I provide a means to operate my invention.

My invention as stated above is incorporated in Figures 1, 2 and 3 where a vacuum type valve 14 is provided for each of the doors of the automobile 11. Secured to said steering column 20 is a vacuum responsive device 76 which consists of a fixed cylinder 78 inclosing a piston 79 and forming a vacuum chamber 80. Attached to said piston 79 is a shaft 81 which is connected to a free link 82. Said link 82 supports and allows rod 83 which is attached to bell-crank 28, to pass freely thru one end thereof. The free end of rod 83 has an upset portion or head 84 formed thereon. Whenever said piston 79 is moved forwardly toward the engine 15, it directly pulls upon the link 82 and in turn will strike the head 84 on rod 83 which will turn bell-crank 28 in a forwardly direction which will operate rods 29 and selector shaft lever 27 placing the automatic-transmission in a non-power driving engagement as described.

In an opening provided in the wall 37 of the body is mounted a housing 88 embodying valve 14. The end of the housing 88 which is adjacent the door is provided with an opening 89. The opposite end of said housing is closed by a screw cap 90 which is secured to the internal threads 91 of the housing embodied therein. Said cap 90 has a vacuum line 92 attached thereto and is connected with an aperture forming a valve opening and port 93. A disk 95 is placed within said housing 88 and held in place by the peripheral end portion of said cap 90, said disk closing off one end of the housing and forming a vacuum chamber 96 within said cap 90. A second vacuum line 97 is secured to said housing 88 and said cap 90 to form an air inlet to said chamber 96. A cylindrical disk 100 is arranged to move horizontally within said housing 88 and formed to rigidly support a connecting rod 101 which extends thru an air tight bushing 102 held in the central portion of disk 95; said rod 101 having a head 103 secured at the end thereof which extends into the vacuum chamber 96; said head 103 having a rubber seal 104 secured on its outer face to close the port 93. The rod 101 is rigidly secured to and extends thru disk 100, and further supports a cylindrical member 105 on its free end. Said member 105 is internally threaded to receive a threaded bolt having a head 107 and stem 108; said bolt forming an adjustable means which in effect lengthens or shortens the connecting rod 101 so that the door 10 will contact said head 107 when said door is in closed position. A locking means 109 is arranged in member 105 to contact said bolt stem 108 to hold same in adjustment. A compression spring 110 is positioned upon the connecting rod 101 between disk 95 and disk 100 which presses said disk 100 toward the end of the housing adjacent the door. When the door is ajar or open, said spring 110 will force disk 100 in a direction which causes bolt head 107 to assume the position shown by dotted lines in Figure 3, which draws the head 103 and seal 104 away from vacuum line port 93. When the door is aagin closed, said port 93 is also again closed by said seal 104. From the above it is clearly seen that should the door 10 be opened, the bolt head 107, directly connected with rod 101, will be pressed outwardly by spring 110 allowing port 93 to be opened. Should the engine 15 be running a high vacuum will be formed in the intake manifold 16, especially when the car is not in motion. The vacuum or suction of the engine thus acts through the pipe 112, through a spring pressed open valve 114, through pipe 115 connected with cap 90 secured to valve 14 and through port 93 to chamber 96, through pipe 97 back to vacuum responsive device 76 where said suction will draw piston 79 forwardly which will effect movement of shaft 81, link 82, rod 83, bell-crank 28, selector rod 29 and selector shaft lever 27. Said movement of lever 27 places gear shift lever 22 in a neutral position and arranges the automatic-transmission so that the vehicle cannot be power driven, accidentally or otherwise.

Preferably the spring loaded valve 114 is incorporated in the vacuum line circuit and closed by the depression of cap portion 116 of said valve, said cap portion can be held down by the driver's foot so that the automobile can be driven for a short period of time in an emergency with one or more of the doors ajar or open. Said valve when depressed closes the passage thru the lines 112 and 115 to the manifold thereby preventing the suction due to the vacuum in the manifold from pulling the selector rod 29 by means of bell-crank 28 which turns the selector shaft lever 27 and places the automatic-transmission in neutral gear relationship. The use of this valve 114 is often necessary should the driver wish to back up the vehicle while holding a door open.

It must be realized from above that the action described with the valve 14 in housing 88 is identical with each valve incorporated with each housing assembled adjacent every door of the vehicle where so mounted. Lines 117 and 118 shown clearly in Figures 1 and 2 are connected in parallel with lines 97 and 115; said lines 117 and 118 are shown dotted in Figure 1 and are shown running to the housing 88 arranged on a post of the vehicle adjacent the rear door thereof. Should said rear door be opened the same action takes place as described before, selector shaft lever 27 is moved to a neutral position, which directly moves selector shaft 26 in the transmission housing.

It will also be understood that the vacuum safety device as described for effecting the mechanical movement of the automatic-transmission control shaft lever 25 and transmission selector shaft 26 is susceptible of considerable variation without departing from the spirit of the invention, and therefore I desire to claim my invention broadly as well as specifically as indicated by the appended claims.

What I claim as new is:

1. In combination with the controlling mechanism of an automobile, an automatic transmission, a manual control lever and associated linkage in connection with said transmission, a vacuum operable member mounted adjacent said transmission and connected with said control lever through its associated linkage, a valve controlled by a door on the automobile and arranged in the piping system of said vacuum operable member for independently operating said control lever to move it to a neutral position and render the automatic transmission ineffective, when the door is in open position, and a manually operable spring loaded valve arranged in the piping system of said vacuum operable member for rendering the vacuum action of said valve controlled by a door ineffective should it be necessary to operate said automobile with a door in open position.

2. In a safety device for a vehicle having an automatic transmission, and in combination with the doors of said vehicle, and an internal combustion engine having an intake manifold, operable valves mounted with the doors, a vacuum responsive device connected with said valves and said manifold by a suitable vacuum pipe line, said transmission having a manual control lever pivotally associated therewith to be moved from a neutral position into a driving position for starting the vehicle, and vice versa, said vacuum responsive device responsive to becoming effective to move said control lever into a neutral position when a door is opened, thereby operating said valve arranged to operate therewith and thereby connecting said vacuum responsive device with said manifold, and an additional manually operable spring loaded valve arranged in the pipe line and mounted upon the floor board of the vehicle whereby it can be operated by the driver's foot to render the vacuum action of said vacuum responsive device ineffective should it be necessary to operate said vehicle with a door in open position.

3. The combination in a motor car having a chassis, an automobile body with doors mounted upon said chassis, an internal combustion engine mounted upon said chassis, a driving unit mounted upon said chassis, an automatic transmission arranged intermediate said engine and said driving unit, said transmission having a manual control lever pivotally associated therewith to be moved from a neutral position into a driving position for starting the vehicle, and vice versa, thereby causing the transmission to be effective and ineffective, said engine having an intake manifold associated therewith, a vacuum responsive device mounted adjacent said transmission and directly connected with said manual control lever by suitable linkage, a manually operable spring loaded valve assembled in a housing and mounted within the automobile body, a spring operable valve member partially assembled in a housing and disposed between a door and adjacent portions of said automobile body, said spring operable valve member arranged to be operated by the spring associated therewith when said door is opened, a vacuum supply line connected to the interior of the manifold and extended to said manually operable spring loaded valve, a pipe line connected with said spring loaded valve and extended to said housing embodying said spring operable valve member mounted adjacent a door, a pipe line connected with said spring operable valve housing and extended to said vacuum responsive device mounted adjacent said transmission, said vacuum responsive device responsive to become effective to move said control lever into a neutral position when a door is opened and said spring operable valve immediately operated thereby and connecting the vacuum of said intake manifold with said vacuum responsive device, and said vacuum responsive device responsive to become ineffective and permit said control lever to remain in driving position when a door is opened and when said manually operable spring loaded valve is operated by the driver, said spring loaded valve preventing the suction due to the vacuum in the manifold from operating said vacuum responsive device.

HENRY A. KUTZER.

REFERENCES CITED

The following references are of record in the file of this patent:

UNITED STATES PATENTS

| Number | Name | Date |
|---|---|---|
| 1,479,062 | Gottschalk | Jan. 1, 1924 |
| 1,664,042 | McGinley | Mar. 27, 1928 |
| 2,167,260 | Laddaga | July 25, 1939 |
| 2,182,426 | Courcier, Sr. | Dec. 5, 1939 |
| 2,340,424 | Ott | Feb. 1, 1944 |